Patented Mar. 30, 1926.

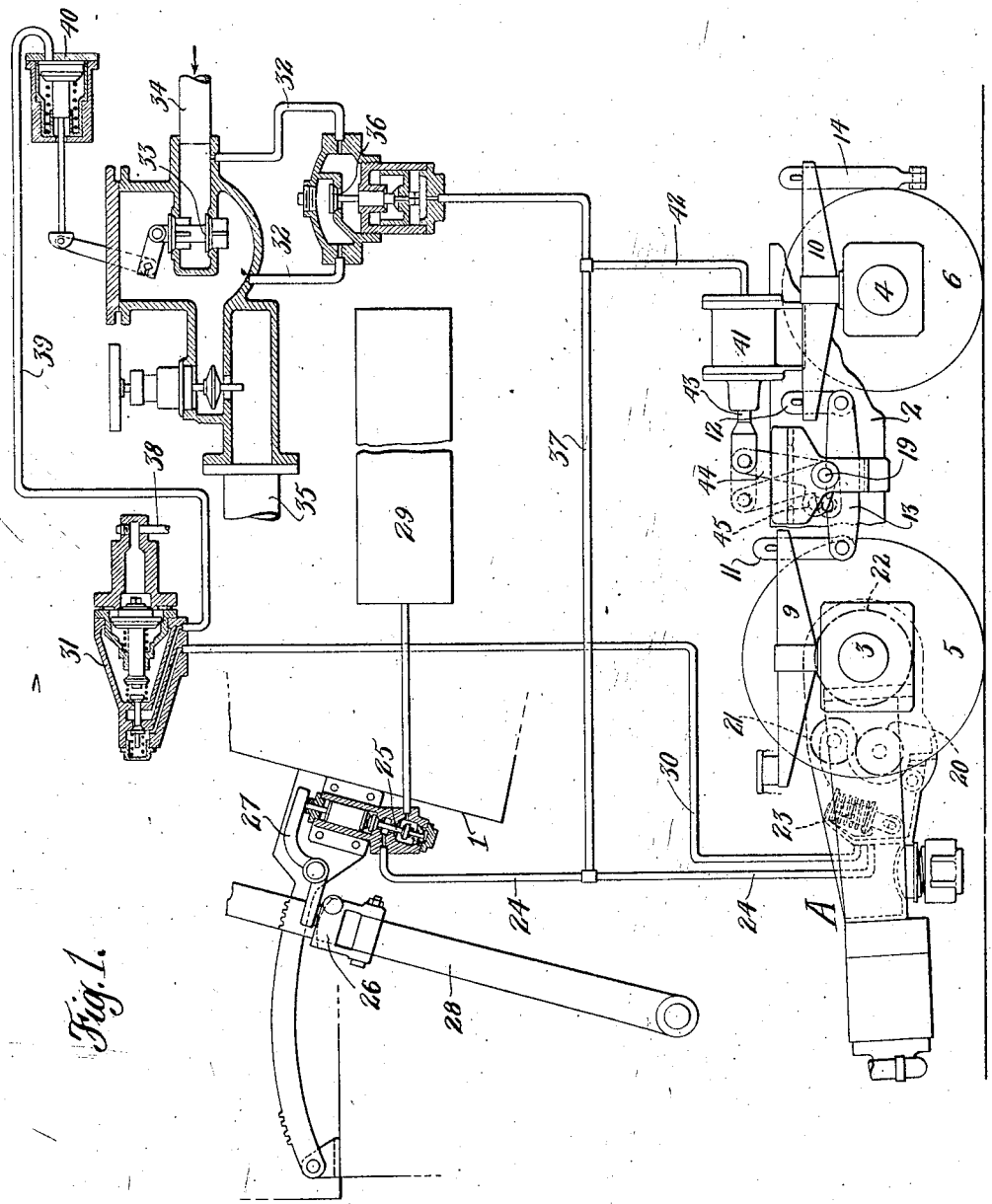

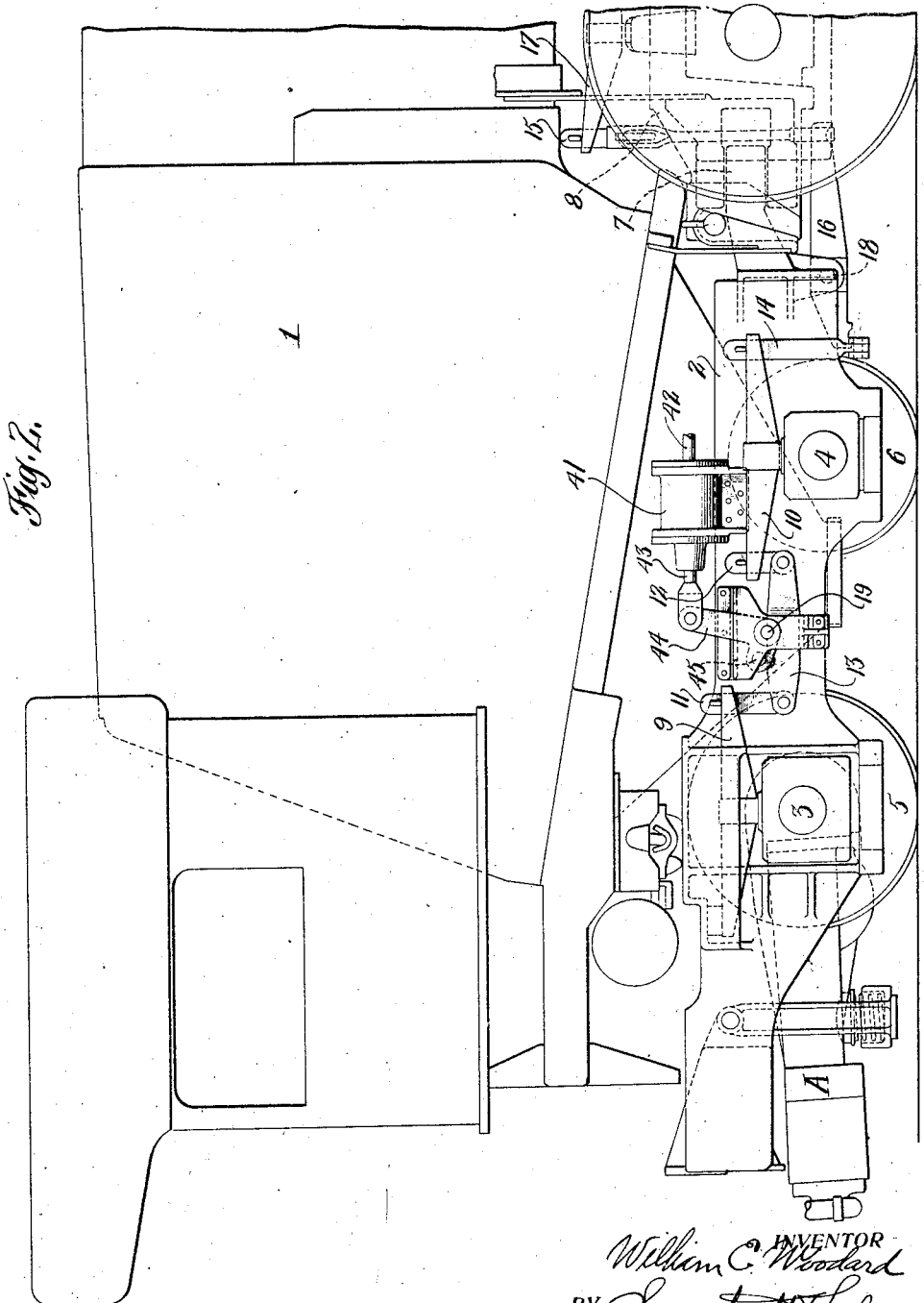

1,578,569

UNITED STATES PATENT OFFICE.

WILLIAM E. WOODARD, OF FOREST HILLS, NEW YORK.

LOCOMOTIVE-BOOSTER APPARATUS.

Application filed June 18, 1923. Serial No. 645,952.

*To all whom it may concern:*

Be it known that I, WILLIAM E. WOODARD, a citizen of the United States, residing at Forest Hills, in the county of Queens and State of New York, have invented certain new and useful Improvements in Locomotive-Booster Apparatus, of which the following is a specification.

This invention relates to locomotive booster or auxiliary motors for aiding the locomotive in starting a train or in helping it during hard pulls at comparatively slow speeds. Such motors are arranged to drive any weight supporting axle either on the locomotive or on the tender.

My invention is particularly useful in connection with the application of a booster or auxiliary engine to one of the axles of a four wheeled truck although it might very readily be incorporated in a truck having a different number of wheels.

The principal object of the invention is to increase the load normally carried by the booster driven axle at such times as the booster is operating. It is a well recognized principle that in a truck having two or more wheel axles the most advantageous distribution of wheel loads is to have the weights at the rail on each pair of wheels substantially equal. It is evident that the wheels to which the booster is attached should have a weight sufficient to give proper adhesion when the booster is in operation.

With most truck designs having two or more wheel axles it will be found that under normal running conditions of the locomotive (that is with the booster idle) the load upon each pair of wheels will be less than that required or at least less than that which is advantageous for the proper functioning of the booster. With a booster capable of developing a certain power it is obvious that the wheels of the axle which it drives should carry enough weight to provide proper adhesion between such wheels and the rails. My invention therefore contemplates the provision of a booster apparatus which will give proper distribution of the weight between the various axles during such time as the booster is not operating but which will give an increased weight to the wheels of the booster driven axle whenever the booster is in operation.

With the foregoing in mind more specific objects of my invention reside in the provision of an apparatus for increasing the load normally carried by a booster driven axle which is directly under the control of the booster system itself so that the increase in load will be provided automatically.

The foregoing together with such other objects as are incident to my invention or may appear hereinafter I attain by means of a construction which is illustrated in preferred form in the accompanying drawings, which drawings disclose the invention as applied to a four wheeled trailer truck under the fire box and cab at the rear end of a locomotive. The truck structure per se is disclosed in my copending application, Serial No. 576,788, filed July 22nd, 1922, which can be referred to if desired.

In the drawings Fig. 1 is a diagrammatical layout of a locomotive booster apparatus embodying my improvements and Fig. 2 is a side elevation of the rear end of a locomotive to which my improvements have been applied. In connection with Fig. 2 it will be understood, of course, that there are many parts of the locomotive structure omitted since they form no part of the present invention.

Referring to the drawings it will be seen that I have shown the rear end of the locomotive 1 as being mounted upon a trailer truck 2 provided with a pair of wheel axles 3 and 4, the axle 3 being provided with a pair of wheels 5 which are of greater diameter than the wheels 6 on the axle 4. The truck is articulated at its forward end 7 to the main frame 8 of the locomotive.

The weight carried by the truck is transmitted to the axles 3 and 4 through the springs 9 and 10 and equalization is effected by means of the equalizing mechanism including the links 11 and 12, the equalizing lever 13, the link 14, lever 16 and link 15. It will be noticed that the outer end of the lever 16 is connected by means of the link 15 to one end of the spring 17 associated with the main frame and wheels of the locomotive.

The lever 16 is normally fulcrumed at the point 18 and the lever 13 at the point 19. It will be understood, of course, that a similar structure exists at both sides of the locomotive but inasmuch as they are duplicates only one side has been illustrated.

The locomotive booster A is arranged to drive the rear axle 3 with which it is associated in a manner now well understood in this art. For the purposes of this application therefore suffice it to say that this booster motor drives the axle 3 through the medium of the driving pinion 20, the idler gear 21 and the driven gear 22 fixed to the axle 3. (See Fig. 1). When it is desired to employ the booster motor air pressure is admitted to the operating cylinder 23 through the medium of pipe 24 and when this is done idler gear 21 is moved into engagement with driven gear 22.

It will be noted that the booster is so mounted that its center of gravity is outside the wheel base of the truck.

Since the details of the booster controlling mechanism do not form a part of the present invention they will be described but briefly. When it is desired to use the booster motor the valve 25 is moved in any suitable manner, preferably by means of a latch 26 and lever 27 associated with the reverse lever 28, so as to establish communication between the air reservoir 29 and the pipe 24. This as previously stated throws the idler gear 21 into mesh with the driven gear 22 after which air pressure can pass out of the operating cylinder 23 into the pipe 30 from whence it flows to the dome pilot valve 31 and is there blocked until such time as the main driving means of the locomotive is functioning.

Prior to this time however the booster motor is slowly reciprocated by the admission of steam in small quantities through the valve controlled by-pass 32 which carries the steam around the booster throttle 33 from the booster dry pipe 34 to the booster dry pipe 35. The valve 36 in the by-pass 32 is opened by air pressure from the pipe 24 which is admitted through the pipe 37.

After the main throttle, not illustrated herein, is opened pressure from the locomotive dry pipe is admitted to the dome pilot valve 31 through the pipe 38 whereupon the pressure previously blocked from the pipe 30 is allowed to pass through the pipe 39 to the booster throttle operating mechanism 40. This opens the booster throttle 33 and allows full pressure to flow from the pipe 34 to the pipe 35 and thence to the booster cylinders.

At the same time that the idler gear is being thrown into mesh with the driven gear 22 air pressure is admitted to the cylinder 41 through pipes 24, 37 and 42. There is a piston in this cylinder which acts through the piston rod 43 to move the bell crank lever 44. This motion changes the fulcrum for the lever 13 from the point 19 to the point 45 as shown in dotted lines in Fig. 1.

By thus changing the fulcrum point of the lever 13, I am enabled to throw a greater proportion of the load upon the driven axle 3 than upon the other axle 4. There are two cylinders 41 with their associated apparatus, one on each side of the truck, but they are arranged to operate simultaneously.

It will be understood of course that it is not necessary to couple the cylinder 41 to the control system of the booster in just exactly the manner indicated inasmuch as it might be associated with the booster controlling system in any way desired. To accomplish certain features of my invention it is not even necessary that the cylinder 41 be coupled to the controlling system of the booster motor at all inasmuch as it might be supplied with fluid pressure from some other source. It is an added part of my invention however to associate the cylinder 41 with the booster controlling system.

The invention enables me to use a booster motor of a size larger than the average size since the adhesion between the wheels 5 and the rails can be brought up to a point which will enable me to make use of the greater power of the larger size booster motor. During the comparatively short periods of time during which the booster motor is operating and also in view of the fact that it operates only at comparatively slow speeds of the locomotive there will be no objection to increasing the weight on the driven wheels. Where the normal load upon a given axle would be say 55,000 or 60,000 lbs. I propose to increase this to say 70,000 or 75,000 lbs. at times when the booster is operating. These figures are purely approximations and are not intended in any way to act as upper or lower limits. By my invention I am enabled to make the booster motor a much more valuable assisting unit since it is of greater size and has a greater tractive power.

I claim:

1. The method of operating a locomotive unit including the usual main driving wheels and at least one pair of normally idle weight carrying wheels and a booster motor for driving idle wheels to supplement the main drivers in starting and at slow speed, which consists in increasing the weight on the wheels driven by the booster motor when the latter is operated.

2. In a locomotive tractive unit provided with a truck having at least two axles with normally idle weight carrying wheels, the combination of a booster motor adapted to drive one of said axles and means for increasing the load on said axle when the booster is in operation.

3. In a locomotive tractive unit provided with a truck having at least two axles with normally idle weight carrying wheels, the combination of a booster motor adapted to drive one of said axles, controlling mechanism for the booster motor, and means under the control of the booster controlling mechanism for increasing the load on said axle when the booster is in operation.

4. The combination with a locomotive, of a pair of load supporting wheel axles, equalizer mechanism for distributing the load between said axles which includes the usual pivoted lever, a booster for driving one of said axles, a controlling system for said booster motor, and means under the influence of said controlling mechanism for shifting the fulcrum of said lever to throw a greater proportion of the load on the driven axle when the booster is operating.

5. The combination with a locomotive, of a pair of load supporting wheel axles, equalizer mechanism for distributing the load between said axles which includes the usual pivoted lever, a booster for driving one of said axles, a fluid pressure actuated controlling mechanism for the booster motor, means for shifting the fulcrum of said lever to throw a greater proportion of the load on the driven axle when the booster is in operation, and a motor means for operating said fulcrum shifting means which is actuated by fluid pressure from the booster controlling mechanism.

6. In a truck having two wheel axles the combination of a booster motor adapted to drive one of said axles mounted with its center of gravity outside the wheel base of the truck and means for increasing the load on the driven axle when the booster is in operation.

7. The combination of a locomotive with its usual driving wheels, a normally idle weight supporting axle with its wheels, a booster motor for driving said axle at starting or at comparatively low speeds, and means for increasing the weight carried by said axle when the booster is operating.

8. The combination of a locomotive with its usual driving wheels, a normally idle weight supporting axle with its wheels, a booster motor for driving said axle at starting or at comparatively low speeds, a controlling system for said booster motor, and means subject to said controlling system for increasing the weight carried by said axle when the booster is operating.

9. The combination of a locomotive with its usual driving wheels, a normally idle weight supporting axle with its wheels, equalizer mechanism for distributing the weight, a booster motor for driving said axle at starting or at comparatively low speeds, a controlling system for said booster motor, and means subject to said controlling system for affecting the equalizer mechanism to distribute more than the normal degree of load to said axle and wheels when the booster is operating.

In testimony whereof, I have hereunto signed my name.

WILLIAM E. WOODARD.